United States Patent [19]

Van Maanen et al.

[11] Patent Number: 5,086,887
[45] Date of Patent: Feb. 11, 1992

[54] ANCHOR PIN FOR BRAKE BAND

[75] Inventors: Keith D. Van Maanen, Berkley; Jeffrey K. Baran, West Bloomfield, both of Mich.

[73] Assignee: General Motors Corporation, Detroit, Mich.

[21] Appl. No.: 576,546

[22] Filed: Aug. 30, 1990

Related U.S. Application Data

[63] Continuation-in-part of Ser. No. 451,046, Dec. 15, 1989, abandoned.

[51] Int. Cl.$^5$ .............................................. F16D 49/08
[52] U.S. Cl. ............................ 188/77 R; 188/206 A
[58] Field of Search ............ 188/77 R, 77 W, 206 A, 188/341; 192/80, 109 R

[56] References Cited

U.S. PATENT DOCUMENTS

| | | | |
|---|---|---|---|
| 3,103,991 | 9/1963 | Flinn | 188/77 R |
| 3,353,637 | 11/1967 | Chana | 188/77 R |
| 3,557,911 | 1/1971 | Ellard | 192/80 X |
| 4,860,860 | 8/1989 | Furuya et al. | 188/77 R |
| 4,930,373 | 6/1990 | Nakawaki et al. | 188/77 R X |

Primary Examiner—Robert J. Oberleitner
Assistant Examiner—Alfred Muratori
Attorney, Agent, or Firm—Donald F. Scherer

[57] ABSTRACT

An anchor pin for a brake band having a reaction surface which provides at least a line of contact between itself and the surface of the brake band anchor bracket and also allows the pin to be oriented such that its centerline need not pass through the center of the brake drum. The reaction surface angle relative to the centerline of the pin is defined by a plane which includes the axis of rotation of the drum and a point of contact between the brake band and the pin. The reaction surface is normal to the direction of force applied by the brake band.

24 Claims, 3 Drawing Sheets

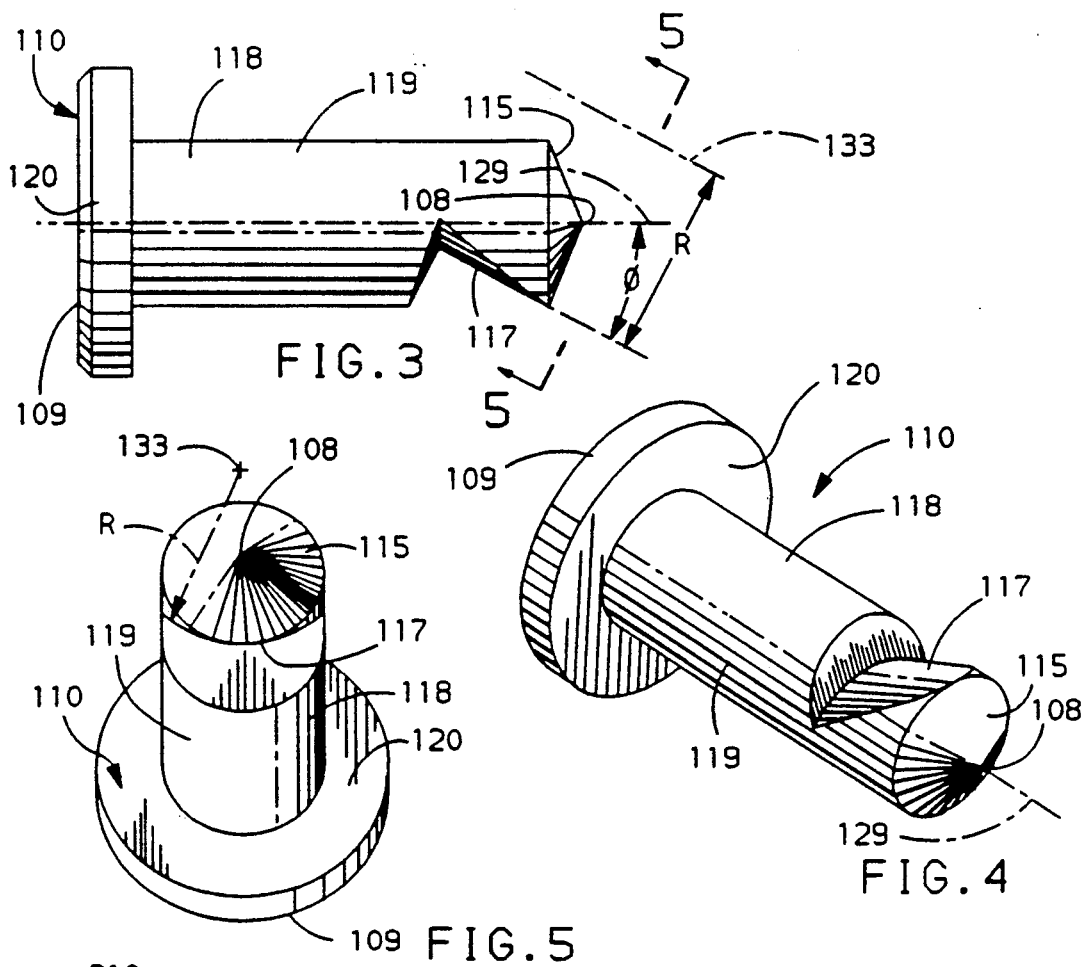
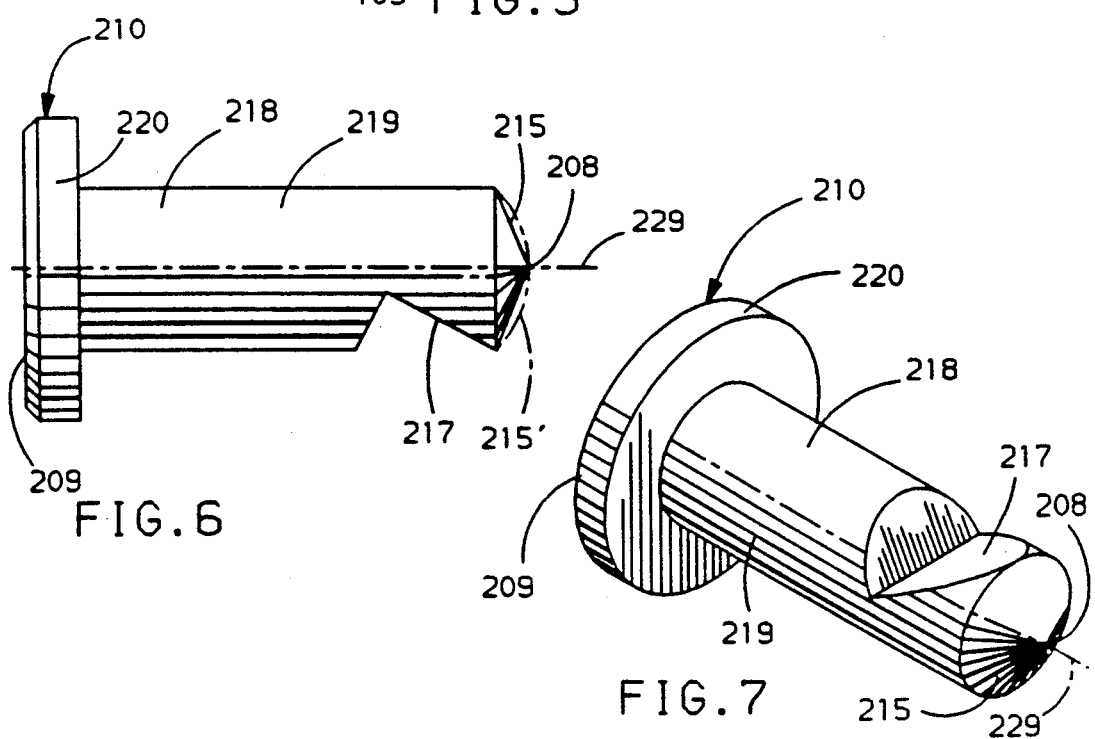

ANCHOR PIN FOR BRAKE BAND

This is a continuation-in-part of application Ser. No. 07/451046 filed 15-Dec.-89, now abandoned, and includes claims 1-4 of that application as claims 21-24 herein.

TECHNICAL FIELD

This invention relates to restraining devices for the fixed end of brake bands as used in automatic vehicle drive transmissions. The exemplary embodiment described in this disclosure establishes an anchor pin having a localized reaction surface at a fixed angle to the centerline of the pin. The localized reaction surface contacts a brake band, limiting the travel of the brake band, and allowing the band to be applied to a corresponding brake drum.

BACKGROUND OF THE INVENTION

Automatic transmissions commonly employ brake bands to engage a desired gearing combination. The brake band wraps around a brake drum. The brake band is restrained on one end. The other end remains free. The band is applied when a force is applied to the free end, displacing it toward the fixed end. This creates tension in the band as it tightens around the drum. As the tension increases, a tangential load between the drum and the band increases. The tangential load decreases the difference in angular velocity between the band and the drum. The drum is fixed relative to the band, and is therefore fixed relative to a transmission case, when the band is fully engaged with the drum.

Two prior art devices which have been employed for restraining brake bands in transmissions are constant diameter pins and ball studs. Both require a boss be provided in the transmission case. The boss is supplied with a constant diameter aperture to retain the pin or stud. Coring the boss in the casting is preferable to not coring because coring reduces both the amount of raw material required and the amount of material removed by machining. Coring also reduces casting porosity by allowing for thinner sections. To minimize transmission case casting complexities associated with the coring of the boss for the pin or stud in the casting, the axis of the aperture in the case for the pin or ball stud is oriented in the same direction as that of the transmission case die pull so the casting core pull is in the same direction.

Beyond the common requirement of being retained within the case, and the preference for having the axis of the pin or stud oriented in the same direction as the die pull, both the constant diameter pins and the ball studs provide advantages and limitations particular to their configuration.

The constant diameter pin is pressed into the transmission case boss aperture. It needs neither a flange to retain the pin nor a specially machined head or angular reaction surface. The pin is effective as a reaction member, but is limited in its ability to be located in a variety of places in the transmission case. The centerline of the pin must pass near the drum's center of rotation. This minimizes the deformation of the brake band anchor bracket produced by contact with the pin and also minimizes axial forces on the pin which would tend to pull the pin into the transmission case.

The requirement that the pin centerline pass near the drum center, combined with the preference for having the centerline of the pin parallel to the direction of draw of the transmission case die, restricts the location of the pin to a number of locations corresponding to the number of dies.

The ball stud, unlike the constant diameter pin, can be located without the need to make its centerline pass near the center of drum rotation. Its centerline is also preferably parallel to the direction of the die pull to minimize casting complexities. Since the contact surface of the ball stud provides a range of tangent surfaces, the anchor bracket will be less likely to slide relative to the pin during a clutch application than if a constant diameter pin were used in a location other than one with its centerline passing near the center of drum rotation. The ball stud must sustain forces trying to pull it into the transmission case. These forces are generated by the application of the brake band when the centerline of the stud is not near the center of rotation of the drum. The ball stud must have a flange on the end, or an alternate method of preventing the stud from being drawn inside.

The ball stud has the disadvantage of providing only point contact with the anchor bracket. This requires precise location of the anchor bracket to ensure that the desired point of tangency on the ball stud is contacted by the brake band anchor bracket. This concern can be reduced by making the anchor bracket sufficiently thick to accommodate the expected variation in the relative positioning of the anchor bracket and the ball stud. A ball stud is also disadvantaged in that a point of contact produces a more localized deformation of the anchor bracket than does a line of contact as found with a constant diameter pin.

SUMMARY OF THE INVENTION

This invention provides an alternate configuration for a brake band anchor pin.

The device disclosed here is unique in that it combines the advantages of both a ball stud and a constant diameter pin. The advantage of the ball stud, which is embodied by this invention, is the ability to be located at any one of several locations around the circumference of the transmission case and still have its axis parallel to the core pull of the transmission case casting. That allows the aperture for the pin to be cored, minimizing porosity as a potential problem in this area of the transmission case without any complicated die configurations. The feature of the pin which is embodied in this invention is a head or a complementary surface against which the brake band can react. A frustoconical head or reaction surface provides a tangential line of contact with the brake band anchor bracket. Notch reaction surfaces provide contiguous contact with the corresponding surface of the brake band anchor bracket. Such fixed angle reaction surfaces provide at least these advantages: a greater tolerance for variations in the location of the brake band reaction surface relative to the location of the pin and less deformation of the brake band reaction surface than with a ball stud.

It is an object of this invention to provide an improved anchor pin for an automatic transmission brake band having a shank capable of locating the pin in the transmission case, a tapered end shape for aiding in insertion of said pin into said aperture and an angled head or reaction surface wherein the angle of the surface is defined by tangency to a plane defined by the rotational axis of the drum and a point on the outside diameter of the pin, with the pin in the installed position in the transmission case, with the head or reaction surface providing at minimum a line of contact with the surface of the brake band anchor bracket while permitting placement of the pin in a variety of locations in the transmission case.

It is also an object of this invention to provide an improved anchor pin for an automatic transmission brake band having a shank capable of locating the pin in the transmission case, a tapered end shape for aiding in insertion of said pin into said aperture and an angled head or reaction surface wherein the angle of the surface is defined by tangency to a plane defined by the rotational axis of the drum and a point on the outside diameter of the pin, with the pin in the installed position in the transmission case, with the head or reaction surface providing at minimum a line of contact with the surface of the brake band anchor bracket while permitting placement of the pin in a variety of locations in the transmission case, and further wherein the pin also has a flange formed integral with said shank and disposed on the distal end of the pin to limit travel of the pin into the transmission case.

It is a further object of this invention to provide an improved anchor pin for an automatic transmission brake band having a shank capable of locating and retaining the pin in the transmission case, a tapered end shape for aiding in insertion of said pin into said aperture and an angled head or reaction surface wherein the angle of the surface is defined by tangency to a plane defined by the rotational axis of the drum and a point on the outside diameter of the pin, with the pin in the installed position in the transmission case, with the head or reaction surface providing at minimum a line of contact with the surface of the brake band anchor bracket while permitting placement of the pin in a variety of locations in the transmission case, and further wherein the pin also has a flange formed integral with said shank and disposed on the distal end of the pin to limit travel of the pin into the transmission case.

These and other objects and advantages will be more apparent from the following description and drawings.

DESCRIPTION OF THE DRAWINGS

FIG. 3 is a profile view of a notched anchor pin with a radiused notch reaction surface.

FIG. 4 is a perspective view of a notched anchor pin with a radius surface notch.

FIG. 5 is a view of a notched anchor pin with a radiused notch reaction surface in the direction of 5—5 of FIG. 3.

FIG. 6 is a profile view of a notched anchor pin with a flat notch reaction surface which is a third embodiment of the invention.

FIG. 7 is a perspective view of a notched anchor pin with a flat notch reaction surface.

DESCRIPTION OF THE PREFERRED EMBODIMENT

Figure 1:
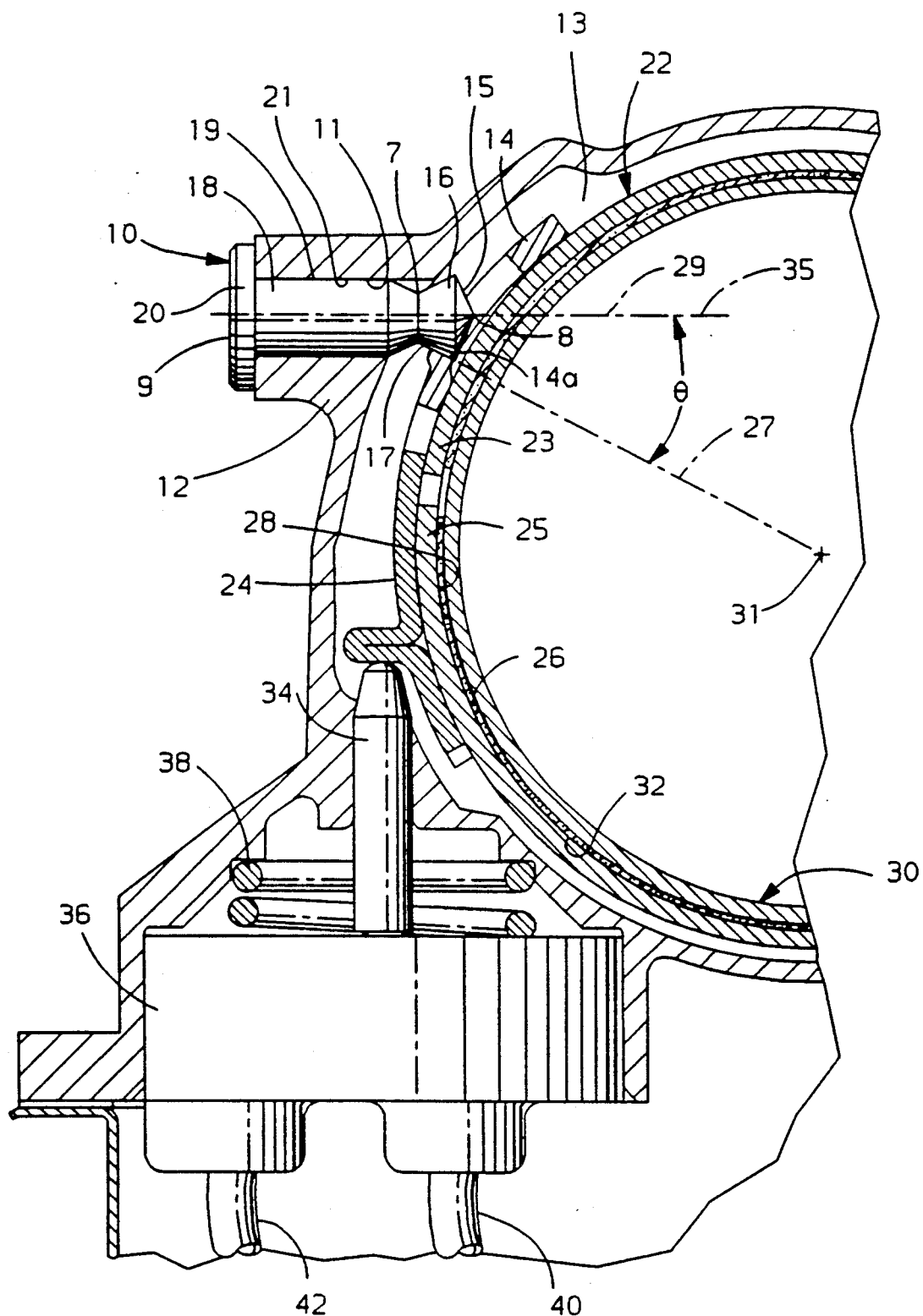
FIG. 1 is a sectional view of a portion of a transmission case and a brake band apply system showing one embodiment of the invention, an anchor pin with a frustoconical head.

The accompanying drawings illustrate three representative forms of an anchor pin providing a localized reaction surface at a fixed angle to the centerline of the pin for restricting the travel of a brake band for the purpose of applying the same brake band. Those three forms are a pin 10 with a frustoconical head 16, a pin 110 with a radiused notch reaction surface 117, and a pin 210 with a flat notch reaction surface 217.

FIG. 1 shows the anchor pin 10 with the frustoconical head 16. The pin 10 is installed in an aperture 11 in a transmission case 12, and engaging a transmission brake band 22 with its frustoconical head 16. A conventional brake band 22 may be constructed in accordance with either U.S. Pat. No. 3,531,896 to Bishop et al., issued Oct. 26, 1966, or U.S. Pat. No. 4,406,394 to Nels, issued Sept. 27, 1983, both assigned to the assignee of the present invention. The brake band 22 is located in a cavity 13 within the transmission case. The elements of the anchor pin 10 are the frustoconical head 16, a shank 18, and a flange 20. The head 16 includes both a frustoconical reaction surface 17 and an end shape or conical surface 15.

The shank 18 has an outside diameter 19 sized to provide a press fit between the shank 18 and an inside diameter 21 of the transmission case aperture 11. Alternatively, a clearance fit could be employed with a seal and a snap ring (not shown). The shank 18 also tapers near the head 16 to a neck 7 where the shank 18 joins the head 16.

The conical surface or end shape 15 could alternatively be a flat, spheroidal, or frustoconical surface with the smaller diameter side of the end shape 15 opposite the rest of the pin 10. The frustoconical reaction surface 17 engages an anchor end 23 of the brake band 22 through an anchor bracket 14. The frustoconical reaction surface 17 and an anchor bracket contact surface 14a are complementary surfaces in that they provide a theoretical line of contact with each other. This line is functionally a surface area of contact as a result of localized deformation that occurs when the two parts press against each other. A transmission brake band apply bracket 24 is also fixed to an apply end 25 of the brake band 22. The brake band 22 has a friction element 26 bonded to its inside diameter surface 28. The brake band friction element 26 contacts a drum 30 outside diameter 32.

The frustoconical reaction surface 17 is defined by tangency to a tangential plane 27 as established by the rotational axis 31 of the brake drum 30 and a point of contact between the anchor pin 10 and the anchor bracket 14. A centerline 29 of the pin 10 and the plane 27 are separated by an angle Theta. The apex angle of the frustoconical reaction surface 17 is twice Theta.

The flange 20 is formed so as to be integral with the shank 18 on one end of the pin 10.

Figure 2:
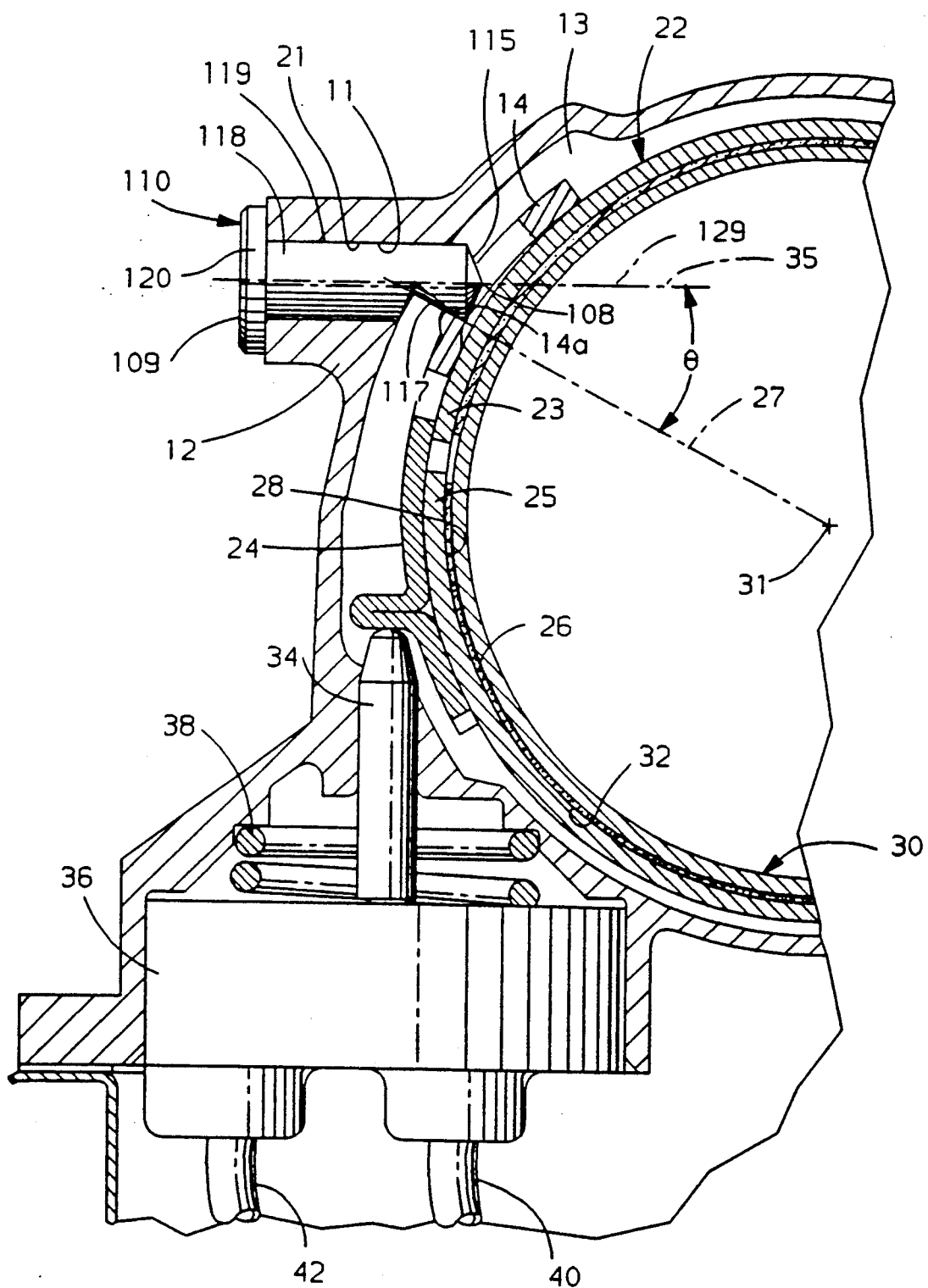
FIG. 2 is a sectional view of a portion of a transmission case and a brake band apply system showing a second embodiment of the invention, a notched anchor pin with a radiused notch reaction surface.

FIG. 2 shows a radiused notch reaction surface anchor pin 110 installed in the transmission case 12. Similarly, a flat notch reaction surface anchor pin 210 as shown in FIG. 6 and FIG. 7 could be installed in the transmission case 12.

The elements of the notched anchor pin 110, 210 are a shank 118, 218, a notch reaction surface 117, 217, a flange 120, 220, and an end shape 115, 215 for the radiused notch reaction surface anchor pin 110 and flat notch reaction surface anchor pin 210 respectively.

The shank 118, 218 has an outside diameter 119, 219 sized to provide a press fit between the shank 118, 218 and the inside diameter 21 of the transmission case aperture 11. Alternatively, a clearance fit could be employed, along with a seal and a snap ring (not shown).

The end shape 115, 215 is located adjacent to the reaction surface 117, 217, opposite the flange 120, 220.

The end shape 115, 215, 215' could alternatively be a flat, spheroidal, or frustoconical surface with the smaller diameter side of the end shape 115, 215 opposite the rest of the pin 110, 210.

The notch reaction surface 117, 217 engages an anchor end 23 of the brake band 22 through an anchor bracket 14. The notch reaction surface 117, 217 and an anchor bracket contact surface 14a are contiguous surfaces. The overlapping areas of the notch reaction surface 117, 217 and the anchor bracket surface 14a are in full contact with one another.

The notch reaction surface 117, 217 is defined in part by tangency to the tangential plane 27 as established by the rotational axis 31 of the brake drum 30 and a point of contact between the anchor pin 110, 210 and the anchor bracket 14. The centerline 129, 229 of the pin 110, 210 and the plane 27 are separated by an angle Theta. FIG. 3 through FIG. 7 show the notch reaction surface 117, 217 in more detail.

The radiused notch reaction surface 117 is in part established by the intersection of the tangential plane 27 and a plane (not shown) perpendicular to the tangential plane 27 and containing the centerline 129 of the pin 110. That intersection establishes a contact line of tangency between the tangential plane 27 and the radiused notch reaction surface 117. The radiused notch reaction surface 117 has a radius R greater than half of the shank outside diameter 119. A centerline 133 for radius R is located the distance R from the above established tangency line in the plane (not shown) which includes the pin centerline 129 and is perpendicular to the tangential plane 27. The radiused notch reaction surface 117 is established by the intersection of the radius R with the pin shank 118. The alternative flat notch reaction surface 217 is established by the intersection of the tangential plane 27 with the pin shank 218.

The flange 120, 220 is formed so as to be integral with the shank 118, 218 on one end of the pin 110, 210.

All three forms of the anchor pin 10, 110, 210 have a proximate end 8, 108, 208 nearest the brake drum 30 and a distal end 9, 109, 209 furthest from the brake drum 30 and the centerline 29, 129, 229 passing through both the proximate end 8, 108, 208 and the distal end 9, 109, 209. The centerline 29, 129, 229 of the pin 10, 110, 210 is coincident with an axis 35 of the aperture. The axis 35 is parallel to a direction of a casting core pull (not shown).

An apply rod 34 contacts an apply bracket 24. The apply rod 34 is connected to a fluid apply mechanism 36. A return spring 38 is placed between the transmission case 12 and the fluid apply mechanism 36. A brake apply fluid inlet line 40 and a brake release fluid inlet line 42 are attached to the fluid apply mechanism 36. The fluid apply mechanism 36 and the return spring 38 can be constructed similar to the servo assembly disclosed in U.S. Pat. No. 3,353,637 to Chana, issued Oct. 22, 1965, and assigned to the assignee of the present invention.

The pin 10, 110, 210 is installed by passing the end shape 15, 115, 215 of the pin through the aperture 11 in the transmission case 12. The end shape 15, 115, 215 facilitates the insertion of the pin 10, 110, 210 into the aperture 11 by centering the pin 10, 110, 210. The shank 18, 118, 218 interferes with the inside diameter 21 of the aperture 11. The pin 10 must be pressed into the aperture 11 in the transmission case 12 because of the intentional interference between the shank 18, 118, 218 and the aperture 11. The flange 20, 120, 220 limits the travel of the pin 10, 110, 210 into the transmission case 12.

When the flange 20, 120, 220 stops the travel of the pin 10, 110, 210 the reaction surface 17, 117, 217 is positioned to engage the anchor bracket 14.

A pin 110, 210 with either a radiused notch reaction surface 117 or a flat notch reaction surface 217 must be oriented to have the reaction surface 117, 217 facing in the reaction direction of the anchor end 23 of the brake band 30 anchor bracket 14.

The anchor pin 10, 110, 210 is subjected to a load when the brake band 22 is applied.

The brake band 22 is selectively applied for the purpose of providing a desired transmission gear ratio by a transmission control system (not shown) which responds to inputs such as gear shift range position and throttle position, and vehicle speed. The control system regulates the pressure of the fluid to the fluid apply mechanism 36.

When the control system provides pressure to the fluid apply mechanism 36, such that the mechanism 36 overcomes the return spring 38, the mechanism 36 displaces the apply rod 34 toward the apply bracket 24. The apply rod 34 contacts the apply bracket 24 on the brake band 22. The apply bracket 24 and the apply end 25 of the brake band 22 move with the apply rod 34. The anchor bracket 14 and the anchor end 23 of the brake band 22 move with the apply bracket 24 until the anchor bracket 14 contacts the anchor pin 10, 110, 210. The anchor pin 10, 110, 210 prevents the anchor end 23 of the brake band 22 from moving any further in the direction of the apply rod 34. Continued loading by the apply rod 34 tightens the brake band 22 around the brake drum 30. The friction material 26 on the brake band 22 which is in contact with brake drum 30 exerts a circumferential load on the drum 30 as a result of the normal load produced against the drum 30 by the tension in the brake band 22. The apply load, provided by the fluid apply mechanism 36, must be sufficiently great in magnitude to prevent the drum 30 from slipping relative to the transmission case 12. The apply load may be varied between applications depending on the desired speed of engagement.

The anchor pin 10 is subjected to the load produced by the engagement of the brake band 22 with the brake drum 30. The direction of the load is tangent to the drum outside diameter 32 at the point where the pin 10, 110, 210 contacts the anchor bracket 14.

The reaction of the pin 10, 110, 210 is composed of a force opposite the applied load at the area of contact combined with a torsional moment. The applied load can be broken down into two force vectors, one parallel to the pin centerline 29, 129, 229 and the second perpendicular to the pin centerline 29, 129, 229. The load parallel to the pin centerline 29, 129, 229 is the load required to resist the force attempting to pull the pin 10, 110, 210 into the transmission case 12. The localized fixed angle reaction surface 17, 117, 217 oriented at an angle such that the surface 17, 117, 217 is tangent to the plane 27 which includes the center of rotation 31 of the drum 30 and the point of contact between the pin 10, 110, 210 and the anchor bracket 14. This minimizes slipping of the anchor bracket 14 relative to the pin 10, 110, 210 during a brake application.

The embodiments of the invention in which an exclusive property or privilege is claimed are defined as follows:

1. An anchor pin for an automatic transmission brake band, the pin having a distal end, a proximate end, and a centerline passing through both the distal end and the proximate end, the pin installed in a transmission case by displacing it so that its centerline follows an axis passing through a side of the transmission case into a cavity within the transmission case in a direction parallel to a casting core pull of the transmission case for that same side, the proximate end of the pin being the first part of the pin to pass through the case on installation and reposing inside of the cavity upon completion of assembly, the distal end of the pin reposing at least in part within the case upon completion of assembly, the proximate end of the pin engaging the brake band through an anchor bracket which is fixed to the brake band, the anchor bracket providing the interface between the anchor pin and the brake band, the precise location of the interface on the bracket being an anchor bracket contact surface, the brake band wrapped around a brake drum, the brake drum mounted on an axis of rotation of the automatic transmission and located within the case cavity, the pin comprising:

- a shank element with an outside diameter having a constant axially extending portion, sized to provide a piloting relationship between the shank and a corresponding aperture in said transmission case, thereby locating said pin;
- an anchor pin reaction surface on said shank for said brake band anchor bracket contact surface, the anchor pin reaction surface of the pin being at an angle to said centerline of said pin, the angle defined by a tangential plane, wherein the plane is defined by said axis of rotation and a desired point of contact between said brake band and said pin;
- an end shape on said proximate end of said pin to facilitate insertion of said anchor pin into said transmission case, the end shape tapering in the distal direction from a diameter less than an inside diameter of said corresponding aperture in said transmission case to a larger diameter.

2. An anchor pin for an automatic transmission brake band as claimed in claim 1 with said anchor pin reaction surface comprising a notch surface in said shank.

3. An anchor pin for an automatic transmission brake band as claimed in claim 2 with both said anchor pin notch reaction surface and said anchor bracket contact surface being of a fixed radius, the radius having a radius centerline defined by the intersection of two planes, a first plane being parallel to said tangential plane and separated from said tangential plane by a distance equal to the radius, and a second plane being perpendicular to said axis of rotation of said automatic transmission and including said centerline of said pin, said anchor pin notch reaction surface and said anchor bracket contact surface being contiguous to one another.

4. An anchor pin for an automatic transmission brake band as claimed in claim 3 with flange means, the flange means formed integral with said shank and disposed on a distal end of said shank, for providing a travel limit for said pin when said pin is inserted into said transmission case.

5. An anchor pin for an automatic transmission brake band as claimed in claim 4 with said shank element sized to provide a press fit relation with said inside diameter of said corresponding aperture in said transmission case, thereby retaining and locating said pin.

6. An anchor pin for an automatic transmission brake band as claimed in claim 3 with said shank element sized to provide a press fit relation with said inside diameter of said corresponding aperture in said transmission case, thereby retaining and locating said pin.

7. An anchor pin for an automatic transmission brake band as claimed in claim 2 with flange means, the flange means formed integral with said shank and disposed on a distal end of said shank, for providing a travel limit for said pin when said pin is inserted into said transmission case.

8. An anchor pin for an automatic transmission brake band as claimed in claim 7 with said shank element sized to provide a press fit relation with said inside diameter of said corresponding aperture in said transmission case, thereby retaining and locating said pin.

9. An anchor pin for an automatic transmission brake band as claimed in claim 2 with said anchor pin notch reaction surface and said anchor bracket contact surface defined by said tangential plane and said anchor pin notch reaction surface and said anchor bracket contact surface contiguous to one another.

10. An anchor pin for an automatic transmission brake band as claimed in claim 9 with a flange means, the flange means formed integral with said shank and disposed on a distal end of said shank, for providing a travel limit for said pin when said pin is inserted into said transmission case.

11. An anchor pin for an automatic transmission brake band as claimed in claim 10 with said shank element sized to provide a press fit relation with said inside diameter of said corresponding aperture in said transmission case, thereby retaining and locating said pin.

12. An anchor pin for an automatic transmission brake band as claimed in claim 9 with said shank element sized to provide a press fit relation with said inside diameter of said corresponding aperture in said transmission case, thereby retaining and locating said pin.

13. An anchor pin for an automatic transmission brake band as claimed in claim 2 with said shank element sized to provide a press fit relation with said inside diameter of said corresponding aperture in said transmission case, thereby retaining and locating said pin.

14. An anchor pin for an automatic transmission brake band as claimed in claim 1 with said anchor pin reaction surface comprising a frustoconical surface which decreases from a maximum diameter located distally to said end shape with the maximum diameter contiguous with said end shape and a minimum diameter at a neck of said pin, an angle of the frustoconical shape defined by said tangential plane.

15. An anchor pin for an automatic transmission brake band as claimed in claim 14 with a flange means, the flange means formed integral with said shank and disposed on a distal end of said shank, for providing a travel limit for said pin when said pin is inserted into said transmission case.

16. An anchor pin for an automatic transmission brake band as claimed in claim 15 with said shank element sized to provide a press fit relation with said inside diameter of said corresponding aperture in said transmission case, thereby retaining and locating said pin.

17. An anchor pin for an automatic transmission brake band as claimed in claim 14 with said shank element sized to provide a press fit relation with said inside diameter of said corresponding aperture in said transmission case, thereby retaining and locating said pin.

18. An anchor pin for an automatic transmission brake band as claimed in claim 1 with flange means, the flange means formed integral with said shank and disposed on a distal end of said shank, for providing a travel limit for said pin when said pin is inserted into said transmission case.

19. An anchor pin for an automatic transmission brake band as claimed in claim 18 with said shank element sized to provide a press fit relation with said inside diameter of said corresponding aperture in said transmission case, thereby retaining and locating said pin.

20. An anchor pin for an automatic transmission brake band as claimed in claim 1 with said shank element sized to provide a press fit relation with said inside diameter of said corresponding aperture in said transmission case, thereby retaining and locating said pin.

21. An anchor pin for an automatic transmission brake band, oriented such that its centerline, when installed in a transmission case, is parallel to a direction of a casting core pull of the transmission case comprising:
   a shank element with an outside diameter sized to provide a press fit relation with an inside diameter of a corresponding hole in said transmission case, thereby retaining and locating said pin, the outside diameter of the shank having a constant axially extending portion and a section at a proximate end of the shank tapering to a neck at a point where the shank joins a head;
   said head being integral with said shank at said proximate end of said shank, said head having a first frustoconical surface which decreases from a maximum diameter at an extreme proximate end to a minimum diameter at said neck of said pin, the maximum diameter of the frustoconical surface being smaller than said outside diameter of said shank, the frustoconical surface providing a reaction surface for said brake band, and having an angle defined by tangency to a plane, wherein the plane is defined by a rotational axis of said drum and a point of tangency on the maximum diameter of said head of said pin; and
   flange means formed integral with said shank and disposed on a distal end of said shank, for providing a travel limit for said pin when said pin is inserted into said transmission case.

22. An anchor pin for an automatic transmission brake band as claimed in claim 21 with a second frustoconical surface on the extreme proximate end of said pin and integral with said pin, which, being presented from the extreme proximate end, facilitates installation of said pin in said transmission case, the second frustoconical surface having a minimum diameter on the extreme proximate end of said pin, and a maximum diameter nearer the rest of said pin, the maximum diameter of the second frustoconical diameter surface being the same diameter as said maximum diameter of said first frustoconical surface.

23. An anchor pin for an automatic transmission brake band as claimed in claim 21 with a conical surface on the extreme proximate end of said pin and integral with said pin, which, being presented from the extreme proximate end, facilitates installation of said pin in said transmission case, the conical surface having a base diameter nearer the rest of said pin than the rest of the conical surface, the base diameter of the conical surface being the same diameter as said maximum diameter of said frustoconical surface.

24. An anchor pin for an automatic transmission brake band as claimed in claim 21 with a spheroidal surface on the extreme proximate end of said pin and integral with said pin, which, being presented from the extreme proximate end, facilitates installation of said pin in said transmission case, the spheroidal surface having a base diameter nearer the rest of said pin then the rest of the spheroidal surface, the base diameter of the spheroidal surface being the same diameter as said maximum diameter of said frustoconical surface.

* * * * *